(12) United States Patent
Xue et al.

(10) Patent No.: US 9,455,626 B2
(45) Date of Patent: Sep. 27, 2016

(54) HYSTERETIC BUCK DC-DC CONVERTER

(71) Applicant: Micrel, Inc., San Jose, CA (US)

(72) Inventors: Dashun Xue, Austin, TX (US);
William MacLean, Austin, TX (US)

(73) Assignee: Micrel, Inc., San Jose, CA (US)

( * ) Notice: Subject to any disclaimer, the term of this patent is extended or adjusted under 35 U.S.C. 154(b) by 181 days.

(21) Appl. No.: 14/205,025

(22) Filed: Mar. 11, 2014

(65) Prior Publication Data

US 2015/0263617 A1    Sep. 17, 2015

(51) Int. Cl.
*H02M 3/158* (2006.01)
*H02M 3/156* (2006.01)
*H02M 1/00* (2006.01)

(52) U.S. Cl.
CPC ............. *H02M 3/156* (2013.01); *H02M 3/158* (2013.01); *H02M 2001/007* (2013.01); *H02M 2001/0025* (2013.01)

(58) Field of Classification Search
CPC .................. H02M 1/14; H02M 3/158; H02M 2001/007; G05F 1/62
USPC ................... 363/45, 46, 47; 323/271
See application file for complete search history.

(56) References Cited

U.S. PATENT DOCUMENTS

| | | | |
|---|---|---|---|
| 6,628,109 B2 | 9/2003 | Rincon-Mora | |
| 7,132,820 B2* | 11/2006 | Walters | H02M 3/156 323/282 |
| 7,439,721 B2 | 10/2008 | Weng et al. | |
| 9,075,423 B2* | 7/2015 | Zhu | G05F 1/575 |
| 2008/0088292 A1* | 4/2008 | Stoichita | H02M 3/156 323/285 |
| 2012/0217941 A1* | 8/2012 | Chen | H02M 3/156 323/271 |
| 2012/0274300 A1* | 11/2012 | Nakashima | H02M 3/156 323/284 |
| 2014/0132232 A1* | 5/2014 | MacLean | H02M 1/00 323/271 |
| 2014/0145692 A1* | 5/2014 | Miyamae | H02M 3/158 323/271 |
| 2014/0239924 A1* | 8/2014 | Guo | G05F 1/46 323/271 |
| 2015/0188434 A1* | 7/2015 | Ouyang | H02M 3/158 323/267 |

* cited by examiner

*Primary Examiner* — Emily P Pham
*Assistant Examiner* — Demetries A Gibson
(74) *Attorney, Agent, or Firm* — Van Pelt, Yi & James LLP

(57) ABSTRACT

A buck switching regulator includes a feedback control circuit using a four-input comparator to regulate the output voltage to a substantially constant level with reduced voltage offset and with fast transient response. In some embodiments, the buck switching regulator uses the four-input comparator to compare a first feedback signal without ripple and a second feedback signal with injected ripple components to a reference level. The four-input comparator generates an output signal to control the switching of the power switches. The buck switching regulator generates an output voltage with increased accuracy and fast transient response. Furthermore, the buck switching regulator can be used with output capacitor having any value of ESR.

14 Claims, 4 Drawing Sheets

HYSTERETIC BUCK DC-DC CONVERTER

BACKGROUND OF THE INVENTION

Switch mode power supplies or switching regulators, also referred to as DC to DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be proportional to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

In particular, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

FIG. 1 is a schematic diagram of a conventional buck switching regulator. Referring to FIG. 1, a switching regulator 1 includes a pair of power switches S1 and S2 configured to receive an input voltage $V_{IN}$ and are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be proportional to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator 1 as a feedback voltage $V_{FB}$ on a feedback node 28. The feedback voltage $V_{FB}$ is compared with the reference voltage $V_{REF}$ at an error comparator 12. The comparator output is coupled to a controller and gate drive circuit 14 to generate control voltages for the power switches based on a switching regulator control scheme. The control voltages are used to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches.

Buck switching regulators or "buck regulators" with fixed on-time control are preferred in the industry for some important advantages as good efficiency for light load in PFM (pulse frequency modulation) mode, easy synchronization with external signals, easy control of a relatively large off-time and a very small fixed on-time to regulate a high input voltage to a low output voltage. Fixed on-time (or constant on-time) regulators are one type of voltage regulators employing ripple-mode control where the output voltage is regulated based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load. The ESR of the output capacitor $C_{OUT}$ is denoted as a resistor $R_{ESR}$ in FIG. 1. Recently, low ESR capacitors are preferred to realize improved efficiency in switching regulators but the low ESR capacitors do not generate enough output ripple for feedback control. In that case, a ripple injection circuit (not shown in FIG. 1) is used to introduce the ripple signal used in the feedback loop. U.S. Pat. Nos. 7,482,791 and 7,482,793 illustrate examples of ripple injection circuits that can be applied in buck regulators using fixed on-time control.

FIG. 2 is a voltage waveform illustrating the output voltage ripple on the feedback voltage $V_{FB}$ of a constant on-time voltage regulator. In operation, a constant on-time (or fixed on-time) regulator switches the output inductor high for a fixed on-time (Ton) when the output ripple falls below a single reference point $V_{REF}$. At the end of the fixed on-time, even if the output ripple may still be below the single reference point, the output inductor is switched low for a minimum off-time before getting switched back high for the fixed on-time again. In the feedback control loop, the output voltage ripple on the feedback voltage $V_{FB}$ is regulated so that the valley of the voltage ripple essentially sits at the reference voltage level ($V_{REF}$), as shown in FIG. 2. The voltage ripple at the feedback node 28 increases for the fixed on-time (Ton) when the high-side power switch is turned on and the voltage ripple at feedback node 28 decreases when the high-side power switch is turned off, and the low side switch is turned on, until the feedback voltage $V_{FB}$ reaches the reference voltage $V_{REF}$.

For voltage regulators using ripple-mode control, while the output ripple is useful in output voltage regulation, it is undesirable because the output ripple introduces an offset to the output voltage, reducing the output signal accuracy. In particular, the average DC voltage (the mid-point) of the ripple voltage signal should be equal to the comparator reference voltage $V_{REF}$. However, as shown in FIG. 2, when the feedback voltage includes a ripple voltage component, the average DC voltage (line 36) of the feedback signal $V_{FB}$ is offset from the reference voltage $V_{REF}$ (line 34) since the comparator, which is referenced to the reference voltage $V_{REF}$, is initiating an on-time when the ripple falls below $V_{REF}$. Hence, it is the lower apex of the triangular waveform that is being regulated, not the average of the triangular waveform. As a result, output voltage $V_{OUT}$ has a DC offset voltage component which affects the accuracy of the buck regulator. For example, the offset at the feedback voltage may be about 10 mV but the offset is gained up through the control circuit and the power switches, due to the presence of the resistor divider (R1/R2), so that the output voltage may experience an offset voltage of 30-50 mV which is unacceptable in most applications. Also, the ripple amplitude will be dependent on load current and the converter input voltage, thus degrading load regulation and PSRR performance.

Furthermore, voltage regulators using ripple-mode control often suffers from instability when the output capacitor has very low ESR. The instability results from the feedback signal $V_{FB}$ not being in phase with the current flowing in the output inductor. The instability adversely affects the transient response of the ripple-mode control voltage regulators.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a buck switching regulator implements a feedback control circuit using a four-input comparator to regulate the output voltage to a substantially constant level with reduced voltage offset and with fast transient response. In some embodiments, the feedback control scheme in the buck switching regulator uses the four-input comparator to compare a first feedback signal without ripple and a second feedback signal with injected ripple components to a reference level. The four-input comparator generates an output signal to control the switching of the power switches. In this manner, the buck switching regulator generates an output voltage with increased accuracy and fast transient response. Furthermore, the buck switching regulator can be used with output capacitor having any value of ESR.

Figure 3:
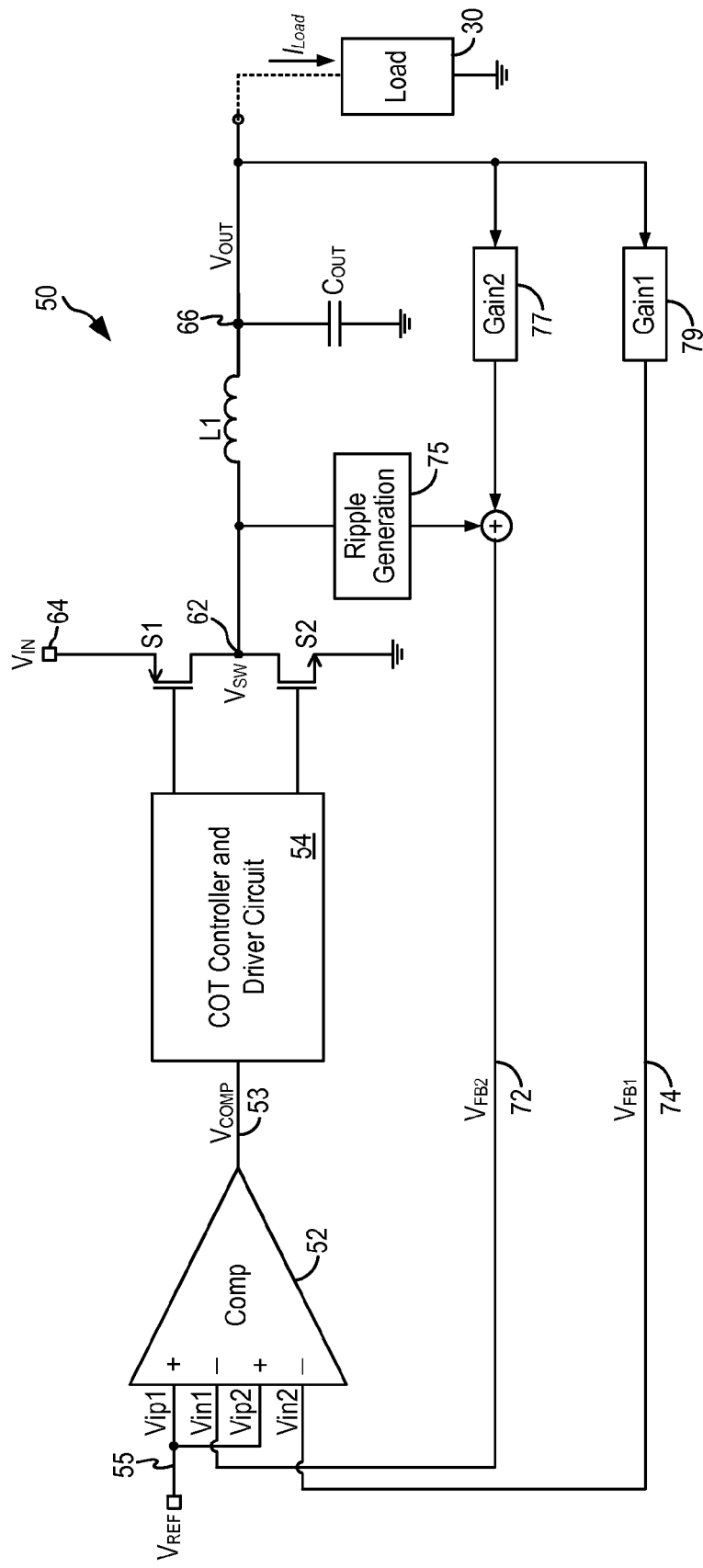
FIG. 3 is a schematic diagram illustrating a buck switching regulator incorporating a four-input comparator in embodiments of the present embodiment.

FIG. 3 is a schematic diagram illustrating a buck switching regulator incorporating a four-input comparator in embodiments of the present embodiment. Referring to FIG. 3, a switching regulator 50 includes a pair of power switches S1 and S2 connected in series between an input voltage $V_{IN}$ (node 64) and a ground potential. Power switches S1 and S2 are alternately turned on and off to generate a switching output voltage $V_{SW}$ at a switch node 62. The switching output voltage $V_{SW}$ is directly coupled to an LC filter circuit including an output inductor L1 and an output capacitor $C_{OUT}$ to generate a regulated output voltage $V_{OUT}$ at a node 66 having a substantially constant magnitude. The output voltage $V_{OUT}$ can then be used to drive a load 30 whereby switching regulator 50 provides a load current $I_{LOAD}$ to maintain the output voltage $V_{OUT}$ at a constant level.

Switching regulator 50 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be proportional to a reference voltage $V_{REF}$ or to a voltage value related to the reference voltage $V_{REF}$. In embodiments of the present invention, the switching regulator 50 implements a constant on-time (COT), variable off-time feedback control scheme. In some cases, a control on-time control scheme is also referred to as "fixed on-time." A COT controller and driver circuit 54 generates the gate drive voltages for controlling the power switches S1 and S2 based on the constant on-time control scheme. Under the constant on-time control scheme, the controller and driver circuit 54 turns on the high-side power switch S1 for a fixed On time (Ton) when the equivalent feedback signal to the feedback control loop falls below the reference voltage $V_{REF}$. At the end of the fixed on-time, even if the feedback signal is still below the reference point, the high-side power switch S1 is turned off for a minimum off-time before getting switched back high for the fixed on-time again. Thus, the inductor current and the output ripple increase for the fixed On time (Ton) when the high-side power switch is turned on; meanwhile, the inductor current and the output ripple decreases when the high-side power switch S1 is turned off until the feedback signal of the feedback control loop reaches the reference voltage $V_{REF}$. In switching regulator 50, the feedback control circuit employs a pair of feedback signals, including a first feedback signal $V_{FB1}$ (node 74) and a second feedback signal $V_{FB2}$ (node 72), as will be described in more detail below.

To implement constant on-time control, the feedback control circuit relies on the ripple components in the feedback signal to regulate the output voltage. In some examples, an output voltage ripple is generated by using an output capacitor $C_{OUT}$ having a sufficiently large equivalent series resistance (ESR). However, capacitors with large ESR are generally more costly and also introduce ripples to the output voltage $V_{OUT}$ itself. In embodiments of the present invention, the output capacitor $C_{OUT}$ is implemented using a capacitor with low or zero ESR so that output voltage ripple and output voltage variation at the output voltage $V_{OUT}$ is minimized. Instead, a ripple generation circuit 75 is used to generate an internal ripple signal which is injected to the feedback control loop of the switching regulator 50. In the present embodiment, the ripple generation circuit 75 generates a ripple voltage signal using the switching output voltage $V_{SW}$ and the ripple voltage signal is injected to the second feedback signal $V_{FB2}$ (node 72), as will be described in more detail below.

In embodiments of the present invention, the feedback control circuit of the switching regulator 50 includes a four-input comparator 52 receiving two feedback signals. More specifically, the feedback control circuit includes a first gain circuit (Gain1) 79 and a second gain circuit (Gain2) 77 to generate two feedback voltage signals $V_{FB1}$ (node 74) and $V_{FB2}$ (node 72). The gain circuits 77 and 79 may have a gain of one or less than one. The gain values of the first and second gain circuits 77, 79 may be the same or they may be different. In some embodiments, the gain values for the first and second gain circuits 77, 79 may be 0.5 and 0.55, respectively. The ripple generation circuit 75 injects the ripple voltage signal to the second feedback voltage signal $V_{FB2}$ (node 72), illustrated by the use of an adder in FIG. 3. The use of an adder in FIG. 3 is symbolic only and in actual implementation, the ripple signal may be injected using other circuit configurations with or without an actual adder circuit.

As thus configured, only the second feedback voltage signal $V_{FB2}$ carries the injected ripple signal generated from the switching output voltage $V_{SW}$. The first feedback voltage signal $V_{FB1}$ is a DC signal and does not carry appreciable ripple signal components. The two feedback voltage signals are coupled to the four-input comparator 52 to be compared with a reference voltage $V_{REF}$. The four-input comparator 52 includes a first positive input terminal (Vip1), a second positive input terminal (Vip2), first negative input terminal (Vin1), and a second negative input terminal (Vin2). The reference voltage $V_{REF}$ is connected to both first and second positive input terminals. The second feedback voltage signal $V_{FB2}$ is coupled to the first negative input terminal Vin1 of comparator 52. The first feedback voltage signal $V_{FB1}$ is coupled to the second negative input terminal Vin2 of comparator 52. The comparator 52 compares the first and second feedback voltage signals to the reference voltage signal without hysteresis, The comparator 52 generates the comparator output signal $V_{COMP}$ (node 53). The comparator output signal $V_{COMP}$ is coupled to the COT controller and driver circuit 54 to generate the driver signals for the power switches in accordance with a constant on-time control scheme. In the present implementation, hysteresis is not needed in the comparator 52.

The operation of the feedback control circuit including the four-input comparator 52 is follows. At the comparator 52, the DC-only feedback voltage signal $V_{FB1}$ operates to shift the comparison point of the ripple-injected feedback voltage signal $V_{FB2}$ relative to the reference voltage $V_{REF}$. More specifically, the DC-only feedback voltage signal $V_{FB1}$ can be described as introducing an offset in the comparison of the ripple-injected feedback voltage signal $V_{FB2}$ to the reference voltage $V_{REF}$. In other words, the DC-only feedback voltage signal $V_{FB1}$ modulates the comparison threshold at which the ripple-injected feedback voltage signal $V_{FB2}$ will cause the comparator output signal to switch. With the comparison offset introduced by the first feedback voltage signal $V_{FB1}$, the ripple-injected feedback voltage signal $V_{FB2}$ is compared with the reference voltage $V_{REF}$. When the ripple-injected feedback voltage signal $V_{FB2}$ falls below the reference voltage $V_{REF}$, the comparator output signal $V_{COMP}$ is asserted to switch on the high-side power switch S1 for a constant on-time cycle.

With the four-input comparator 52 thus configured, the DC-only feedback voltage signal $V_{FB1}$ and the ripple-injected feedback voltage signal $V_{FB2}$ are combined together and the combined, equivalent feedback signal is compared with the reference voltage $V_{REF}$. The comparator output signal $V_{COMP}$ is a function of both the DC-only feedback voltage signal $V_{FB1}$ and the ripple-injected feedback voltage signal $V_{FB2}$.

The buck switching regulator 50 as thus configured provides many advantages. First, the feedback control circuit in the buck switching regulator corrects the error from the injected ripple by offsetting the main comparator. More specifically, the error from the injected ripple is reduced by half by the use of the four-input comparator in the feedback control circuit of the buck switching regulator.

Figure 1:
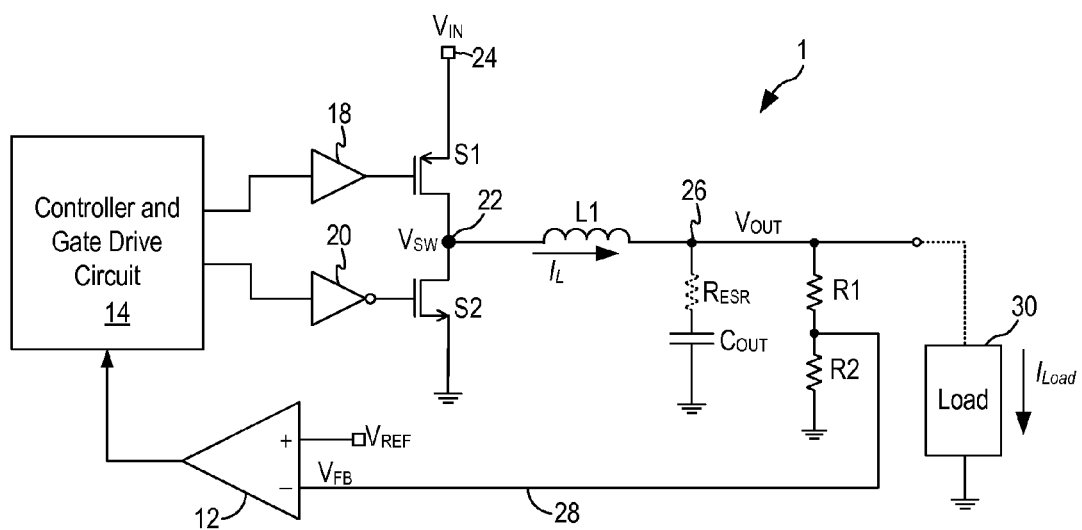
FIG. 1 is a schematic diagram of a conventional buck switching regulator.
Figure 2:
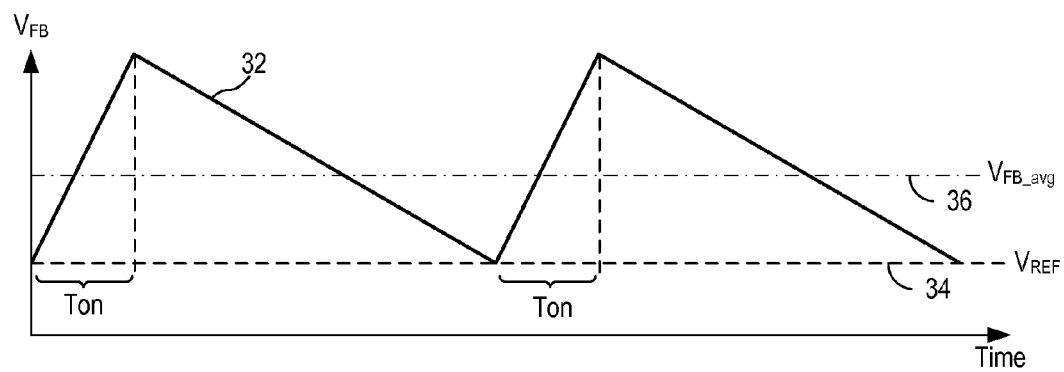
FIG. 2 is a voltage waveform illustrating the output voltage ripple on the feedback voltage $V_{FB}$ of a constant on-time voltage regulator.

In the conventional switching regulator, a two-input comparator is used to compare a ripple-injected feedback signal to the reference voltage signal. The feedback signal may have a feedback scaling factor of a such that $V_{FB} = \alpha V_{OUT}$. The feedback signal carries the injected ripple and the DC component of the regulator output voltage. The feedback signal waveform 32 in FIG. 2 illustrates the relationship between the feedback signal and the reference voltage $V_{REF}$. The output voltage of the switching regulator is given as:

$$V_{REF} = \alpha V_{OUT} - \frac{Vpp}{2}; \text{ and}$$

$$V_{OUT} = \frac{1}{\alpha}\left(V_{REF} + \frac{Vpp}{2}\right),$$

where Vpp denotes the peak-to-peak voltage of the ripple-injected feedback signal. The Vpp/2 term represents the offset error introduced by the injected ripple.

However, in the buck switching regulator using a four-input comparator to receive separately the DC-only feedback signal and the ripple-injected feedback, the output voltage of the switching regulator is given as:

$$2V_{REF} = 2\alpha V_{OUT} - \frac{Vpp}{2}; \text{ and}$$

$$V_{OUT} = \frac{1}{\alpha}\left(V_{REF} + \frac{Vpp}{4}\right).$$

Accordingly, in the buck switching regulator of the present invention, the offset introduced by the injected ripple is reduced by half to Vpp/4.

Second, the buck switching regulator employing a four-input comparator uses a DC only feedback signal to shift the comparison threshold of the ripple-injected feedback signal. The buck switching regulator is able to achieve fast transient response and can be used with output capacitor having any ESR value.

Figure 4:
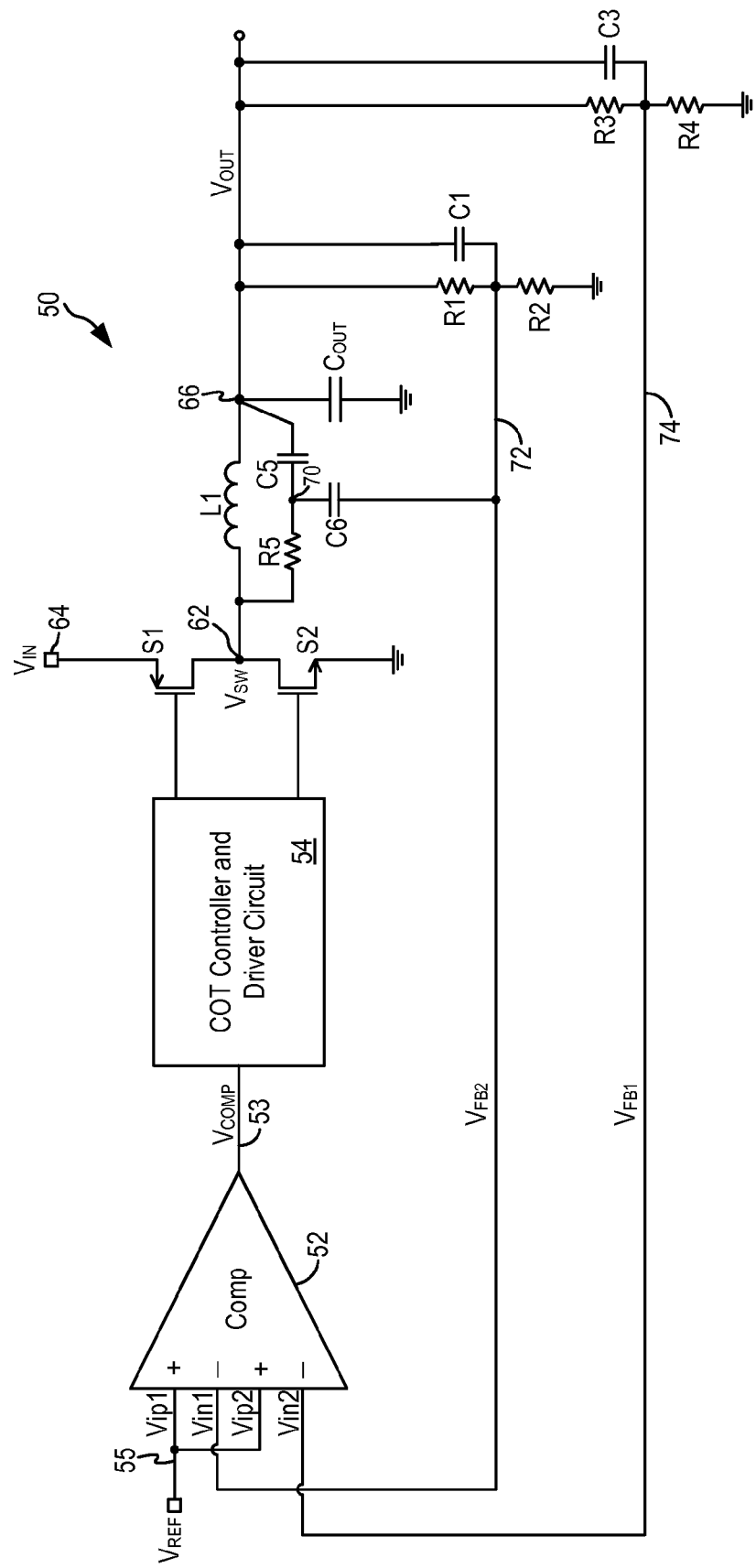
FIG. 4 is a schematic diagram illustrating a buck switching regulator incorporating a four-input comparator in embodiments of the present embodiment.

FIG. 4 is a schematic diagram illustrating a buck switching regulator incorporating a four-input comparator in embodiments of the present embodiment. More specifically, FIG. 4 illustrates an exemplary implementation of the ripple generation circuit and the gain circuits in the switching regulator 50 of FIG. 3. Referring to FIG. 4, in the present embodiment, the ripple injection circuit is implemented using a resistor R5 and a capacitor C5 connected in series across the inductor L1, that is between nodes 62 and 66. A capacitor C6 connects to the common node 70 and the second feedback voltage signal $V_{FB2}$ (node 72). The resistor R5, capacitors C5 and C6 operate to inject a ripple signal into the second feedback voltage node.

In the present embodiment, the first and second gain circuits are implemented as voltage dividers. More specifically, the first gain circuit is formed by resistors R3 and R4 connected in series between the output voltage node 66 and the ground potential. The common node 74 between resistors R3 and R4 is the first feedback signal $V_{FB1}$ which includes the DC voltage component of the output voltage $V_{OUT}$ only. A capacitor C3 is connected in parallel with resistor R3 to filter and stabilize the feedback voltage. Capacitor C3 is optional and may be omitted in other embodiments.

The second gain circuit is formed by resistors R1 and R2 connected in series between the output voltage node 66 and the ground potential. The common node 72 between resistors R1 and R2 is the second feedback signal $V_{FB2}$ which includes the DC voltage component generated from the output voltage $V_{OUT}$ and the injected ripple signal. A capacitor C1 is connected in parallel with resistor R1 to filter and stabilize the feedback voltage. Capacitor C1 is optional and may be omitted in other embodiments. The voltage divider ratio for the first gain circuit and the voltage divider ratio for the second gain circuit can be the same or they can be different. Thus, the resistance values for resistors R1 and R2 and resistors R3 and R4 can be the same or they can be different.

Figure 5:
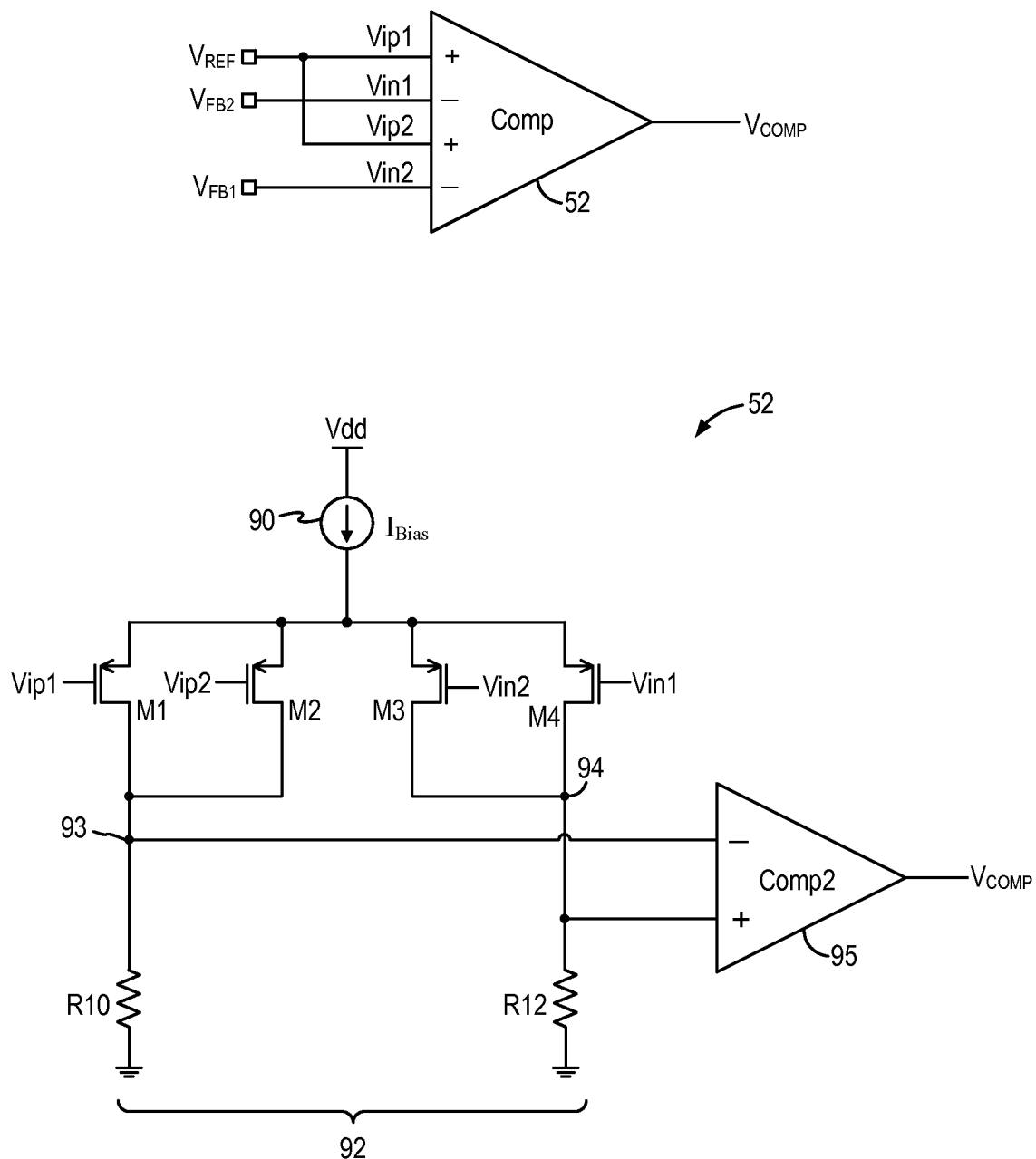
FIG. 5 illustrates an exemplary embodiment of a four-input comparator which can be incorporated in the feedback control circuit of the buck switching regulator of FIG. 3.

FIG. 5 illustrates an exemplary embodiment of a four-input comparator which can be incorporated in the feedback control circuit of the buck switching regulator of FIG. 3. Referring to FIG. 5, the four-input comparator 52 includes two comparison stages 92, 95. The first comparison stage 92 includes input transistors M1 to M4 configured to receive the comparator input signals. In particular, transistors M1 and M2 are connected in parallel between a bias current source 90 and a node 93. The gate terminals of transistors M1 and M2 receive the reference voltage $V_{REF}$. Transistors M3 and M4 are connected in parallel between the bias current source 90 and a node 94. The gate terminal of transistor M3 receives the DC-only feedback signal and the gate terminal of transistor M2 receives the ripple-injected feedback signal. The second comparison stage 95 has a negative input terminal coupled to node 93 and a positive input terminal coupled to node 94. The second comparison stage 95 generates the comparator output signal $V_{COMP}$. As thus configured, the DC-only feedback signal shifts the DC level of the ripple-injected feedback signal at node 94. Meanwhile, the reference voltage $V_{REF}$ is doubled at node 93. The shifted ripple-injected feedback signal is compared with the double reference voltage at the second comparison stage 95 to generate the comparator output signal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A buck switching regulator being configured to receiving an input voltage and to generate a regulated output voltage, the buck switching regulator controlling a high-side switch and a low-side switch based on a feedback control scheme to drive a switch output node for generating a switching output voltage, the switch output node being coupled to an LC filter to generate the regulated output voltage having a substantially constant magnitude on an output node, the buck switching regulator including a feedback control circuit comprising:

a feedback network including first and second gain circuits configured to generate first and second feedback signals, respectively, indicative of the regulated output voltage;

a ripple generation circuit configured to generate a ripple signal using the switching output voltage and to inject the ripple signal to the second gain circuit; and a four-input comparator having first and second positive input terminals configured to receive a reference signal, a first negative input terminal configured to receive the second feedback signal with the injected ripple signal, and a second negative input terminal configured to receive the first feedback signal with the DC component only of the regulated output voltage, the four-input comparator being configured to generate a comparator output signal having an output level being a function of the first feedback signal, the second feedback signal and the reference signal, wherein the first feedback signal is applied to shift the comparison threshold for the comparison between the second feedback signal and the reference signal to reduce a voltage offset in the regulated output voltage due to the injected ripple signal at the second gain circuit.

2. The buck switching regulator of claim 1, wherein the four-input comparator comprises a first comparison stage configured to shift the DC level of the second feedback signal using the first feedback signal, and a second comparison stage configured to compare the DC-shifted second feedback signal to the reference signal or a signal related to the reference signal.

3. The buck switching regulator of claim 1, wherein the first feedback signal has the same magnitude or a different magnitude than the second feedback signal.

4. The buck switching regulator of claim 1, wherein the first gain circuit comprises a voltage divider having a first divider ratio and the second gain circuit comprises a voltage divider having a second divider ratio, the first divider ratio being the same as or different from the second divider ratio.

5. The buck switching regulator of claim 1, further comprising:

a controller and driver circuit configured to drive the high-side switch and the low-side switch in response to the comparator output signal, the comparator output signal being asserted to turn on the high-side switch.

6. The buck switching regulator of claim 5, wherein the comparator output signal is asserted in response to the DC-shifted second feedback signal falling below the reference signal or a signal related to the reference signal.

7. The buck switching regulator of claim 5, wherein the controller and driver circuit implements a constant on-time feedback control scheme.

8. A method in buck switching regulator receiving an input voltage and controlling a high-side switch and a low-side switch using a feedback control scheme to drive a switch output node for generating a switching output voltage, the switch output node being coupled to an LC filter circuit to generate a regulated output voltage having a substantially constant magnitude on an output node, the method comprising:

generating a first feedback signal indicative of the regulated output voltage;

generating a second feedback signal indicative of the regulated output voltage;

generating a ripple signal using the switching output voltage;

injecting the ripple signal to the second feedback signal; and generating, using a four-input comparator, a comparator output signal having an output level being a function of the first feedback signal, the second feedback signal and the reference signal, wherein the first feedback signal is applied to shift the comparison threshold for the comparison between the second feedback signal and the reference signal to reduce a voltage offset in the regulated output voltage due to the injected ripple signal at the second gain circuit.

9. The method of claim 8, wherein generating, using a four-input comparator, a comparator output signal comprises:

shifting the DC level of the second feedback signal using the first feedback signal; and comparing the DC-shifted second feedback signal to the reference signal or a signal related to the reference signal.

10. The method of claim 8, wherein the first feedback signal has the same magnitude or a different magnitude than the second feedback signal.

11. The method of claim 8, wherein generating a first feedback signal indicative of the regulated output voltage comprises dividing the regulated output voltage by a first divider ratio to generate the first feedback signal; and generating a second feedback signal indicative of the regulated output voltage comprises dividing the regulated output voltage by a second divider ratio to generate the first feedback signal, the first divider ratio being the same as or different from the second divider ratio.

12. The method of claim 8, further comprising:

driving the high-side switch and the low-side switch in response to the comparator output signal, the comparator output signal being asserted to turn on the high-side switch.

13. The method of claim 12, wherein generating, using a four-input comparator, a comparator output signal comprises:

asserting the comparator output signal in response to the DC-shifted second feedback signal falling below the reference signal or a signal related to the reference signal.

14. The method of claim 12, wherein driving the high-side switch and the low-side switch in response to the comparator output signal comprises:

driving the high-side switch and the low-side switch in response to the comparator output signal under a constant on-time feedback control scheme.

* * * * *